(12) United States Patent
Price et al.

(10) Patent No.: US 11,094,074 B2
(45) Date of Patent: Aug. 17, 2021

(54) IDENTIFICATION OF TRANSPARENT OBJECTS FROM IMAGE DISCREPANCIES

(71) Applicant: Microsoft Technology Licensing, LLC, Redmond, WA (US)

(72) Inventors: Raymond Kirk Price, Redmond, WA (US); Yuri Pekelny, Seattle, WA (US); Michael Bleyer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/518,791

(22) Filed: Jul. 22, 2019

(65) Prior Publication Data

US 2021/0027479 A1      Jan. 28, 2021

(51) Int. Cl.
| | |
|---|---|
| *G06T 7/55* | (2017.01) |
| *H04N 5/247* | (2006.01) |
| *G06T 7/00* | (2017.01) |
| *G06T 7/70* | (2017.01) |
| *G06T 17/20* | (2006.01) |

(52) U.S. Cl.
CPC ............... *G06T 7/55* (2017.01); *G06T 7/70* (2017.01); *G06T 7/97* (2017.01); *G06T 17/20* (2013.01); *H04N 5/247* (2013.01); *G06T 2207/10012* (2013.01); *G06T 2207/10028* (2013.01);
(Continued)

(58) Field of Classification Search
CPC .... G06T 7/97; G06T 7/55; G06T 7/70; G06T 17/20; G06T 7/20; G06T 2207/10012; G06T 2207/10028; G06T 2207/10081; H04N 5/247
See application file for complete search history.

(56) References Cited

U.S. PATENT DOCUMENTS

| | | | |
|---|---|---|---|
| 10,196,141 B1 * | 2/2019 | Cui ...................... | G02B 27/288 |
| 10,574,974 B2 * | 2/2020 | Arora ................... | H04N 13/282 |

(Continued)

FOREIGN PATENT DOCUMENTS

EP        3343507 A1      7/2018

OTHER PUBLICATIONS

Lysenkov et al.; "Recognition and Pose Estimation of Rigid Transparent Objects with a Kinect Sensor," 2013 Robotics: Science and Systems Conference (RSS), Technische Universität Berlin, Berlin, Germany; pp. 273-280 (Year: 2013).*

(Continued)

*Primary Examiner* — Edward Martello
(74) *Attorney, Agent, or Firm* — Alleman Hall Creasman & Tuttle LLP

(57) ABSTRACT

A computing system is provided. The computing system includes a visible light camera, a thermal camera, and a processor with associated storage. The processor is configured to execute instructions stored in the storage to receive, from the visible light camera, a visible light image for a frame of a scene and receive, from the thermal camera, a thermal image for the frame of the scene. The processor is configured to detect image discrepancies between the visible light image and the thermal image and, based on the detected image discrepancies, determine a presence of a transparent object in the scene. The processor is configured to, based on the detected image discrepancies, output an identification of at least one location in the scene that is associated with the transparent object.

16 Claims, 11 Drawing Sheets

(52) U.S. Cl.
CPC .............. *G06T 2207/10048* (2013.01); *G06T 2207/20081* (2013.01)

(56) References Cited

U.S. PATENT DOCUMENTS

| | | | |
|---|---|---|---|
| 10,586,337 B2* | 3/2020 | Sanchez Bermudez | G06T 7/143 |
| 2014/0306874 A1* | 10/2014 | Finocchio | G06F 3/017 |
| | | | 345/156 |
| 2015/0373286 A1 | 12/2015 | Matsuoka | |
| 2019/0371053 A1* | 12/2019 | Engholm | G01B 11/25 |

OTHER PUBLICATIONS

Verhoeven et al.;"Spectral Characterization of a Digital Still Camera's NIR Modification to Enhance Archaeological Observation;" IEEE Transactions on Geoscience and Remote Sensing, vol. 47, No. 10, Oct. 2009; pp. 3456-3468 (Year: 2009).*

Vidas et al.;"3D Thermal Mapping of Building Interiors using an RGB-D and Thermal Camera;" 2013 IEEE International Conference on Robotics and Automation (ICRA), Karlsruhe, Germany, May 6-10, 2013; pp. 2311-2318 (Year: 2013).*

Mériaudeau et al.; "Review and comparison of non-conventional imaging systems for three-dimensional digitization of transparent objects;" SPIE Journal of Electronic Imaging 21(2), 021105 (Apr.-Jun. 2012); six pages (Year: 2012).*

Cao et al.; "Depth and thermal sensor fusion to enhance 3D thermographic reconstruction;" Optical Society of America; vol. 26, No. 7 | Apr. 2, 2018 | Optics Express 8179; published Mar. 21, 2018 (Year: 2018).*

Alt et al. "Reconstruction of Transparent Objects in Unstructured Scenes With a Depth Camera;" 2013 IEEE International Conference on Image Processing, Melbourne, VIC, 2013, pp. 4131-4135 (Year: 2013).*

Michael Vollmer, Klaus-Peter Möllmann, "Teaching physics and understanding infrared thermal imaging ," Proc. SPIE 10452, 14th Conference on Education and Training in Optics and Photonics: ETOP 2017, 104522C (Aug. 16, 2017); doi: 10.1117/12.2266142 (Year: 2017).*

Guo-Hua, et al., "Transparent Object Detection and Location based on RGB-D Camera", In Journal of Physics Conference Series, vol. 1183, vol. 1, Mar. 1, 2019, pp. 1-10.

Hagg, et al., "On Recognizing Transparent Objects in Domestic Environments Using Fusion of Multiple Sensor Modalities", In Proceedings of 20th RoboCup International Symposium, Jul. 4, 2016, 12 Pages.

Ihrke, et al., "Transparent and Specular Object Reconstruction", In Journal of Computer Graphics Forum, vol. 29, Issue 8, Nov. 10, 2010, pp. 2400-2426.

Wang, et al., "Glass Object Segmentation by Label Transfer on Joint Depth and Appearance Manifolds", In Proceedings of International Conference on Image Processing, Sep. 15, 2013, pp. 2944-2948.

"International Search Report and Written Opinion issued in PCT Application No. PCT/US2020/037367", dated Apr. 19, 2021, 11 Pages.

* cited by examiner

IDENTIFICATION OF TRANSPARENT OBJECTS FROM IMAGE DISCREPANCIES

BACKGROUND

A variety of imaging technologies currently exists to detect data, often in the form of light, for the rendering of both two-dimensional and three-dimensional images. A sampling of these technologies includes RGB cameras for images from visible light, night visions cameras for low-light images in the visible and IR wavelength range, and infra-red cameras that detect in different regions of the IR range. Depth-sensing devices may also be employed, for example a stereo pair of cameras, a projector, and/or a laser; methods for detecting depth include structured light and time of flight, among others. Difficulties in detecting objects and determining depth values can vary widely depending on physical depths, characteristics of the imaged objects, lighting conditions, and depth sensor technology, etc.

SUMMARY

A computing system is provided. The computing system may include a visible light camera, a thermal camera, and a processor with associated storage. The processor may be configured to execute instructions stored in the storage to receive, from the visible light camera, a visible light image for a frame of a scene and receive, from the thermal camera, a thermal image for the frame of the scene. The processor may be configured to detect image discrepancies between the visible light image and the thermal image and, based on the detected image discrepancies, determine a presence of a transparent object in the scene. The processor may be further configured to, based on the detected image discrepancies, output an identification of at least one location in the scene that is associated with the transparent object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Although numerous imaging devices and technologies exist through which images may be rendered for two and three-dimensional imaging, some objects remain difficult to detect depending on the imaging technology employed. In particular, transparent objects such as windows may not be detectable and/or discernable using known imaging approaches. Visible light (VL) images, infra-red (IR) images, thermal images, and depth images generated via time-of-flight data may exclude or provide inaccurate or undiscernible representations of transparent objects. For example, a depth map created for a scene that includes a window may only produce a void area or inaccurate information in the map where the window is located. When image data is subsequently processed into a surface reconstruction, a transparent object may not be properly represented. Windows are specular reflectors for light, and are lossy reflectors in the IR range. Thus, when rendering a depth image, depth values for locations of transparent objects may be given as void values. Hence, detecting and rendering transparent objects such as windows and glass has been problematic in imaging fields.

Described herein are a system and methods for detecting and rendering visually transparent objects present in images. Although transparent objects may not be readily discernable in IR and VL images, by using image data from these sources in the system described below together with thermal images, transparent objects may be detected, labeled, and assigned estimated depth values. In particular, as VL images and thermal images may include different image features from the same scene, discrepancies between the image features in each respective type of image may be indicators of a transparent object when properly processed. One tool that may be harnessed to this end is machine learning classifiers. Output from processing VL and thermal images on the basis of image discrepancies, whether via a classifier or other means, may include pixels labeled in images, bounding boxes for transparent objects, point clouds, and surface meshes including points and/or regions with descriptors identifying transparency, to give a few examples.

Figure 1:
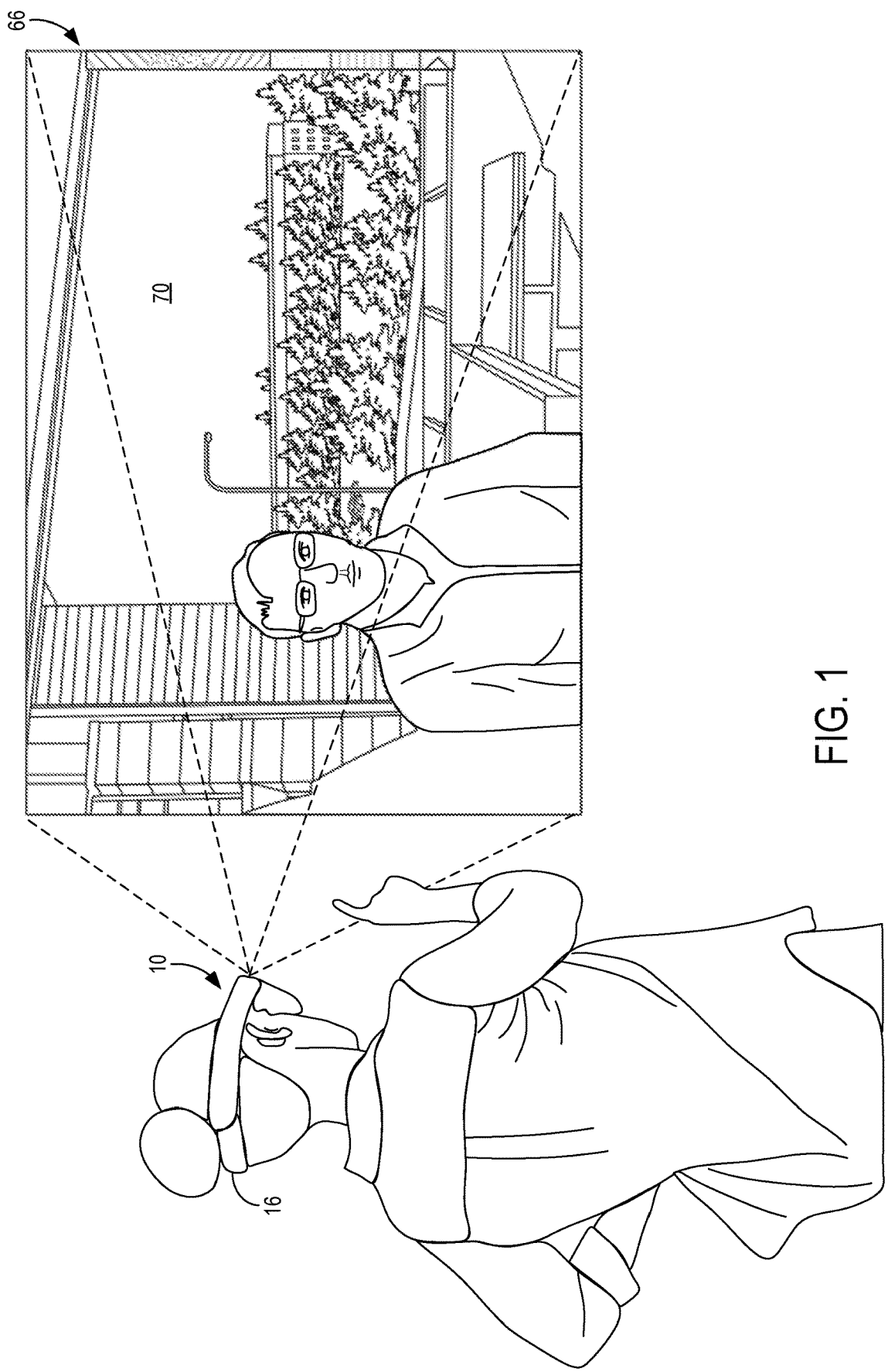
FIG. 1 shows a computing system according to an example implementation of the present disclosure.

FIG. 1 shows a computing system 10 according to an example implementation of the present disclosure. In the case of FIG. 1, the computing system 10 is included in a head-mounted display (HMD) device 16. The computing system 10 includes a VL camera 12 and a thermal camera 14, as discussed below with respect to FIG. 3. The VL camera 12 and the thermal camera 14 each detect images for the HMD device 16. In FIG. 1, a user of the HMD device 16 views a scene 66 that includes a human figure in the foreground, a transparent object 70 that is a window, and other foreground and background objects. As discussed below, the computing system 10 may determine both the presence of the transparent object 70 and its depth by processing the images received from the VL camera 12 and the thermal camera 14.

Figure 2:
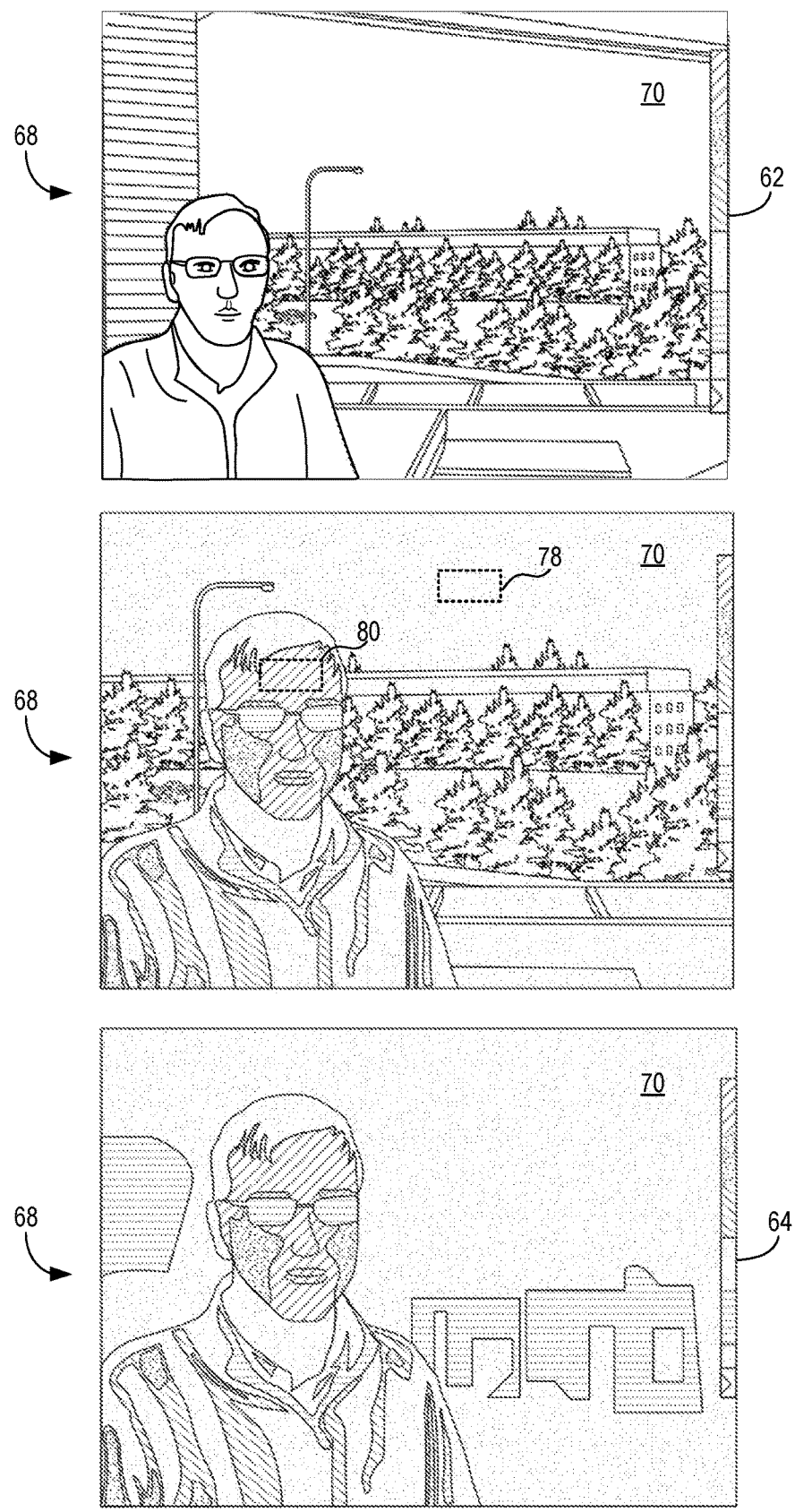
FIG. 2 depicts example images received by the computing system of FIG. 1.

FIG. 2 depicts example images received by the computing system 10. Each image is associated with a frame 68 of a scene 66, such as the example scene shown in FIG. 1. As used herein, in addition to usage associated with how cameras may capture individual or successive images, "frame" may refer to collected information associated with a view of a scene 66, for example image data from visible light cameras, IR cameras, thermal cameras, and depth values from depth cameras or otherwise derived. For example, depth, visible light, and thermal information may be merged in a frame, with location-specific values tied to pixels or other portions of the frame.

Continuing with FIG. 2, the top image is a representation of a VL image 62 taken by the VL camera 12. The bottom image is a representation of a thermal image 64 taken by the thermal camera 14. It will be appreciated that the image data in these two images differs with respect to the features recorded in the respective images. While the top image clearly depicts background objects such as trees and buildings on a far side of the window, the bottom image merely depicts a reflection in the window without the background objects apparent in the top figure. However, the bottom image quite clearly shows details of the human figure in the foreground that are lost in the VL image 62 at the top, where the backlit human figure appears dark. Also, the window is indicated by some reflections detected by the thermal camera 14 in the bottom image. The middle image in FIG. 2 shows a combination of image features from the VL image 62 and the thermal image 64. It will be appreciated that by examining both images, a determination may be made of features that may otherwise be only apparent in one or the other of the VL image 62 and the thermal image 64. By distinguishing differences in image features between the VL image 62 at the top of FIG. 2 and the thermal image 64 at the bottom of FIG. 2, the computing system 10 may identify the presence of the window that is a transparent object 70 in the images, and determine the depth of the transparent object 70 as described below.

Figure 3:
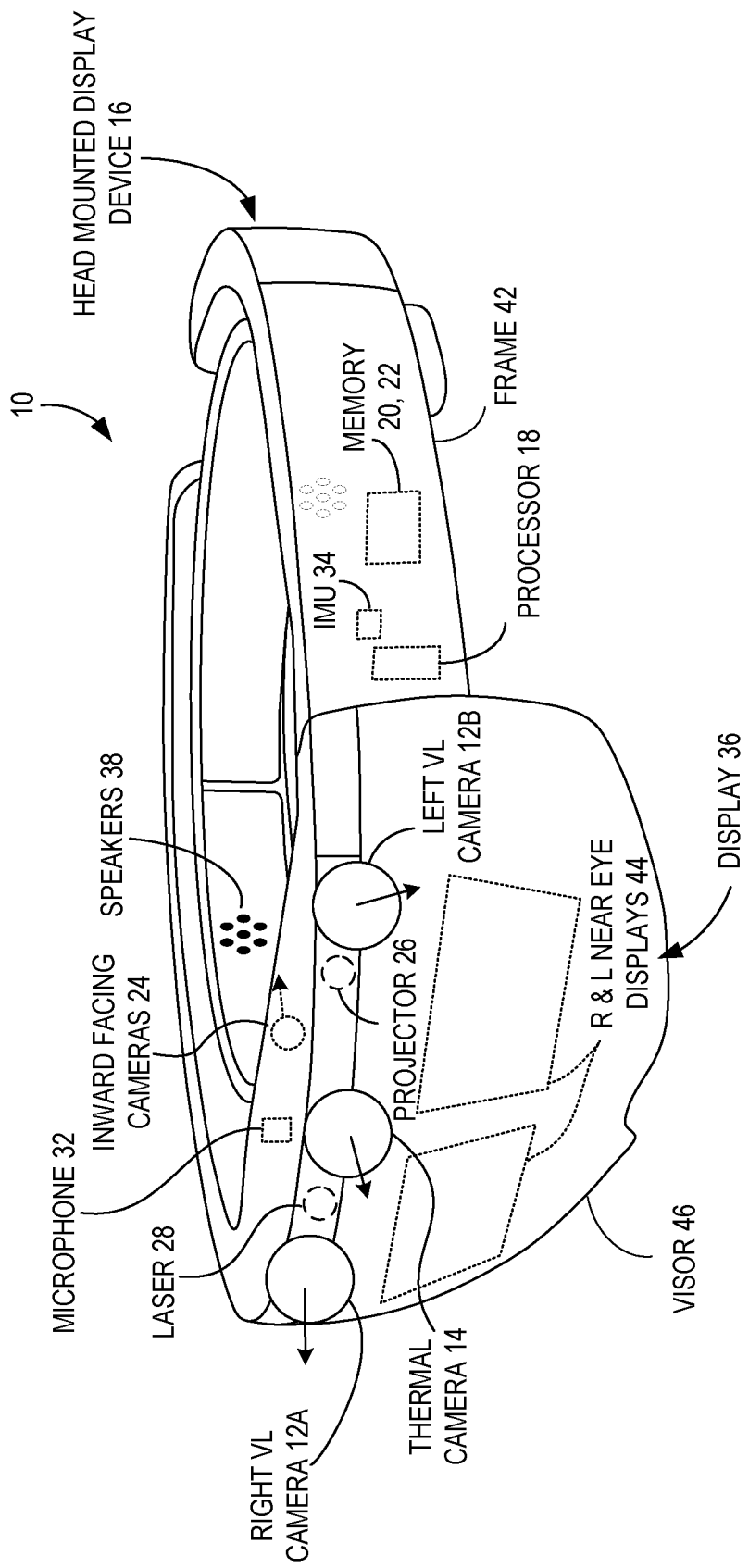
FIG. 3 is an example implementation of the computing system of FIG. 1.

FIG. 3 is an example implementation of the computing system 10 according to an example implementation of the present disclosure. In this example, as in FIG. 1, the computing system 10 is integrated into and/or implemented as an HMD device 16. In one example implementation, the computing system 10 may include a single VL camera or, as depicted, right and left VL cameras 12A, 12B that may be a stereo pair of cameras on either side of HMD device 16 as shown in FIG. 3. The VL cameras may be RGB cameras and/or low-light cameras such as IR cameras configured for night vision. Thermal camera 14 may also be included in the computing system 10, as shown in FIG. 3. Arrows in FIG. 3 indicate the direction cameras may be facing. The VL camera 12 may be configured to receive and detect light in a range of 350 nm to 1200 nm and/or 1000 nm to 1600 nm, thus the VL camera 12 may be sensitive to some wavelengths of light in the IR range. The thermal camera 14 may be configured to receive and detect IR light in a range of 5,000 nm to 15,000 nm. It will be appreciated however that cameras included in the computing system 10 may be sensitive to various ranges of electromagnetic radiation as preferred by designers of the computing system 10.

A depth detection system may also be included in the computing system 10 and integrated into the HMD device 16. The depth detection system may include components such as a pair of stereo cameras and/or a pair of stereo low-level light cameras. Alternatively, the depth detection system may include a single camera and an inertial measurement unit (IMU) 34. Other depth detection systems may include a single camera and a light projector 26, a pair of cameras and the light projector 26, and/or a laser light source 28 and a camera. For example, passive stereo methods of depth detection may only utilize a right and left camera. The right and left camera may be a pair of stereo cameras, a pair of stereo low-level light cameras as described above, and the like. However, active stereo methods of depth detection may additionally process light projected by a projector 26 that may be received at right and left cameras; a projector 26 is shown in dash in FIG. 3 to indicate its presence when included. A structured light method of depth detection may also be integrated into the computing system 10, in which case a projector 26 and one camera to receive reflected projected light may be utilized. If a time-of-flight method of depth detection is preferred, the HMD device 16 may include a laser light source 28 and corresponding sensor such as an IR laser in addition to a camera to receive reflected laser light. A laser light source 28 is shown in dash in FIG. 3 to indicate its presence when included. In another configuration, an IMU 34 and a single camera may be used to detect depth.

The example computing system 10 includes a processor 18 and associated storage, which in FIG. 3 includes volatile memory 20 and non-volatile memory 22. The processor 18 is configured to execute instructions stored in the storage, using volatile memory 20 while executing instructions belonging to various programs and non-volatile memory 22 for storage of the programs. The non-volatile memory 22 may store machine learning (ML) programs as described below. Other sensors that may be included in the computing system 10 as embodied in the HMD device 16 may be inward facing cameras 24 to identify the position and orientation of each of a user's eyes and subsequently generate eye-tracking data. Also, a microphone 32 may receive natural language (NL) input from a user of the HMD device 16.

An IMU 34 may be additionally implemented in the HMD device 16 as described above, which in turn may include accelerometers, gyroscopes, and/or a compass that can detect, for example, a 6 degree of freedom (6 DOF) position and orientation of the HMD device 16. The processor 18 may further refine the 6 DOF output of the IMU 34 using visual tracking systems that search for movement of identified visual features in a series of images captured by the VL camera 12 (right and left VL cameras 12A, 12B in FIG. 3) and/or thermal camera 14 to generate an estimate of the relative movement of the HMD device 16 based upon the movement of these visual features within successive image frames 68 captured by the cameras 12, 14 over time. It will be appreciated that components such as the microphone 32 and/or one or more of the cameras 12, 14 may be integrated with the HMD device 16, or provided separately therefrom. It will be further appreciated that other types of sensors not displayed in FIG. 3 may be included in the computing system 10, such as other types of cameras, for example.

A display 36 may be integrated with the HMD device 16, or optionally provided separately. Speakers 38 may also be included in the HMD device 16, or also provided separately. It will be appreciated that electronic and computing components may be connected via a bus 40 (shown in FIG. 4). As shown in FIG. 3, the processor 18, volatile and non-volatile memories 20, 22, inward facing cameras 24, VL camera 12 or right and left VL cameras 12A, 12B, microphone 32, IMU 34, and speakers 38 may be incorporated within a housing of the HMD device 16 as shown. The HMD device 16 may include a mounting frame 42 that at least partially encircles the head of a user, and the display 36 may include a pair of right and left near-eye displays 44. The near-eye displays 44 may be positioned behind a visor 46 through which a user may observe the physical surroundings in an augmented reality (AR) system. It will be appreciated that the near eye displays 44 and visor 46 may be at least partially transparent, enabling the user to see through these components to view the real environment, at least when content is not opaquely displayed on the near-eye displays 44.

Figure 4:
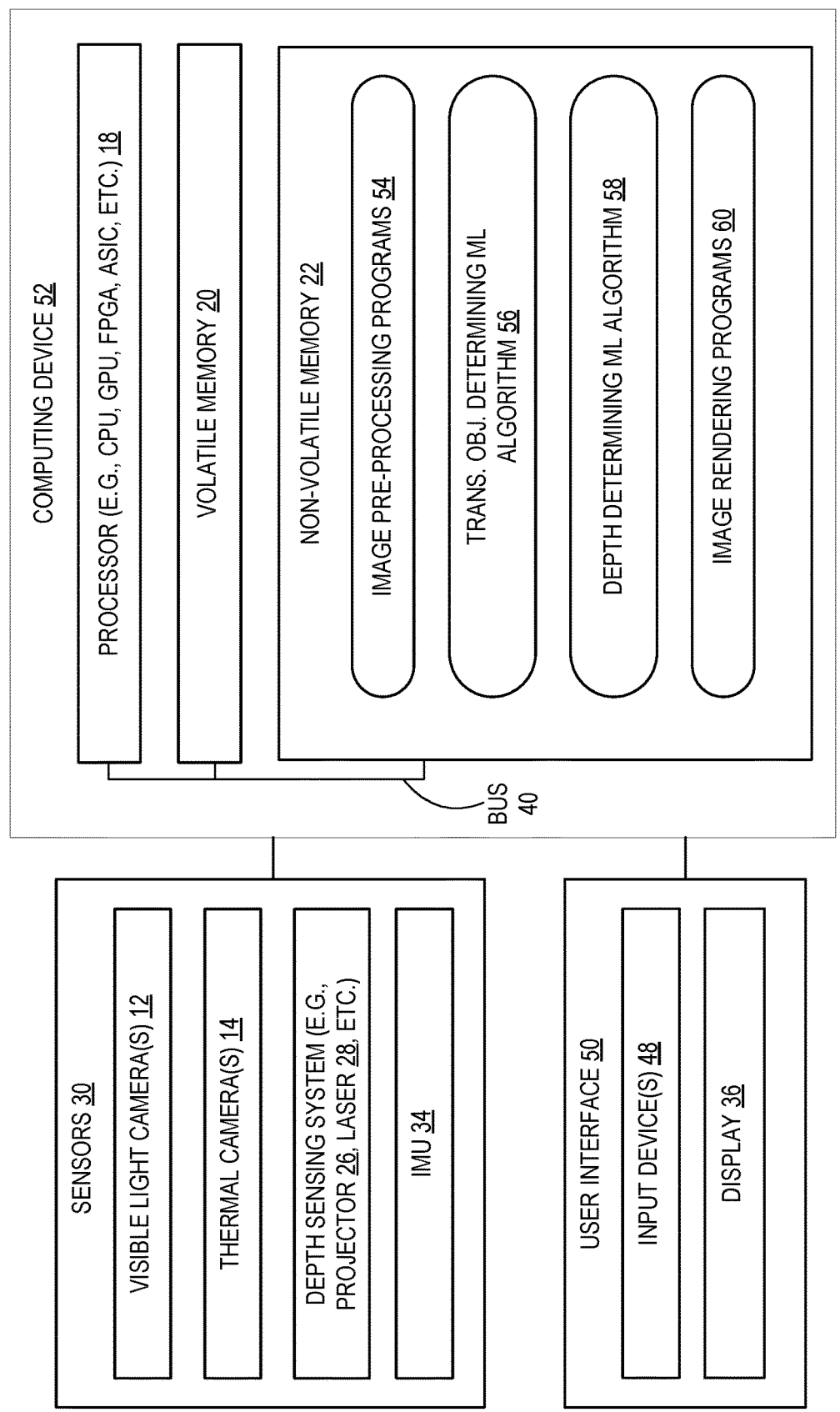
FIG. 4 is a schematic of the computing system of FIG. 1 according to an example implementation.

Turning now to FIG. 4, a schematic of the computing system 10 according to an example implementation is depicted. A computing device 52 may be included in the computing system 10, for example as a subsystem, and both may be implemented in connection with an HMD device 16. Sensors 30 may be connected to the computing device 52, and may include the VL camera 12 (or right and left VL cameras 12A, 12B), one or more thermal cameras 14, a depth detection system as described above, an IMU 34, and other sensors 30 not explicitly shown in FIG. 4. It will be appreciated that the depth detection system may be optional; as discussed below, depth may be determined from a single frame having information from both a VL camera 12 and a thermal camera 14. A user interface 50 (e.g., input/output mechanisms) may also be provided in the computing system 10; the user interface 50 may include the display 36 and one or more input devices 48 that may in turn include a keyboard, mouse, touch screen, and/or game controller, etc.

Figure 11:
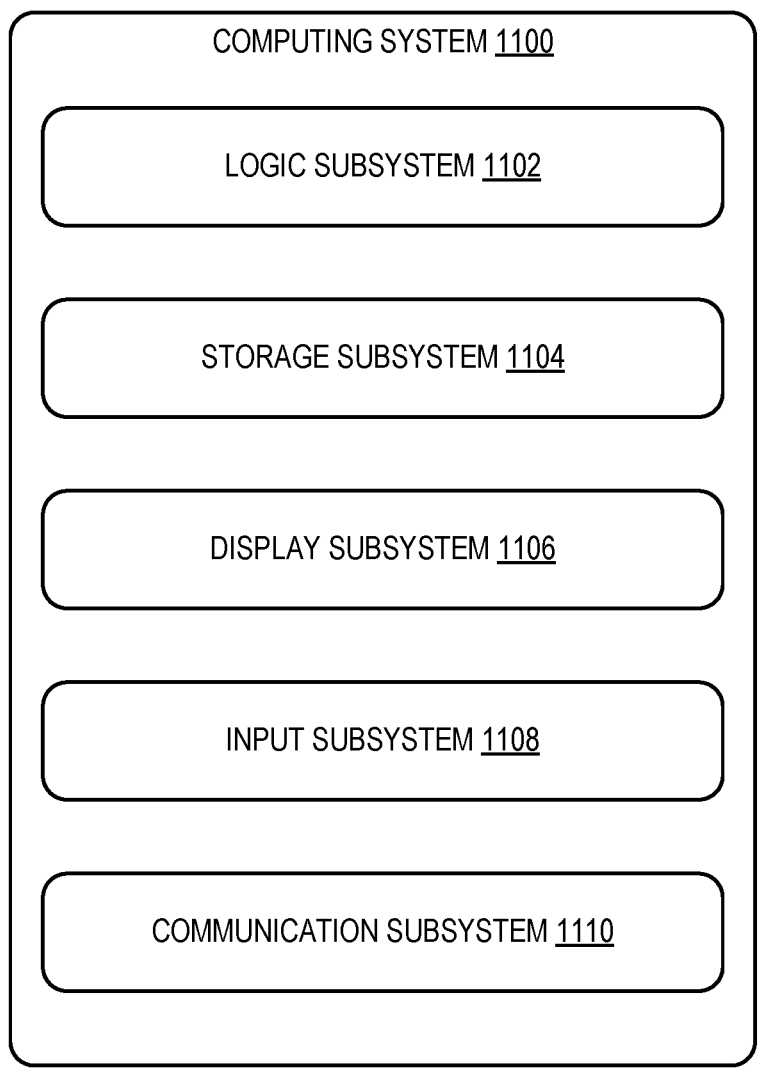
FIG. 11 is an example computing environment, which may be used to implement the computing system of FIG. 1.

The computing device 52 may include the processor 18, which may be a CPU, GPU, FPGA, ASIC, other type of processor or integrated circuit. The volatile memory 20 and non-volatile memory 22 may also be included in the computing device 52. The non-volatile memory 22 may store instructions to be executed by the processor 18. As shown in FIG. 4, programs included in the non-volatile memory 22 may include image pre-processing programs 54 and image rendering programs 60. A transparent-object-determining ML algorithm 56 and a depth-determining ML algorithm 58 may also be included in the non-volatile memory 22, each of which will be discussed in further detail below. It will be appreciated that the components of the computing device 52 may be connected by a bus 40. Furthermore, FIG. 11 depicts various computing system components that may correspond to the components of FIG. 4, and the descriptions of those components in FIG. 11 may therefore apply to such corresponding components in FIG. 4.

Figure 5:
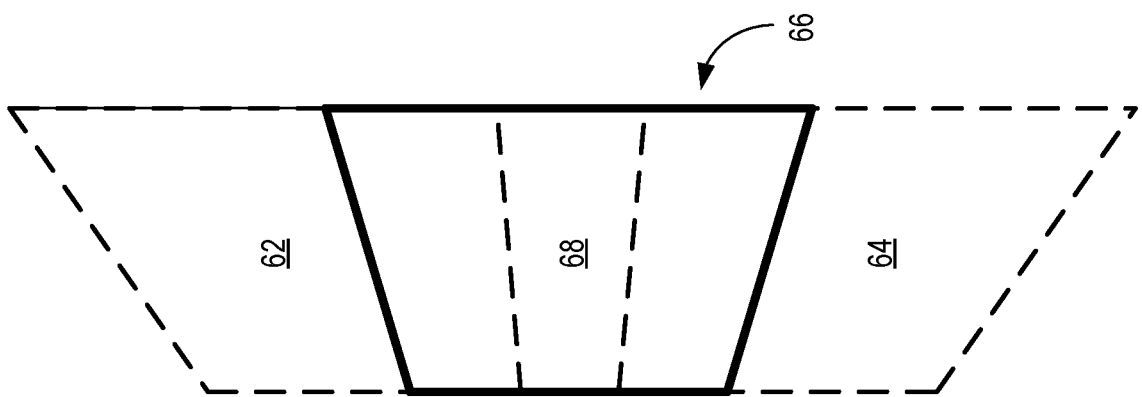
FIG. 5 shows an example implementation of the computing system of FIG. 1 and a schematic of images to be received by the computing system.
Figure 5:
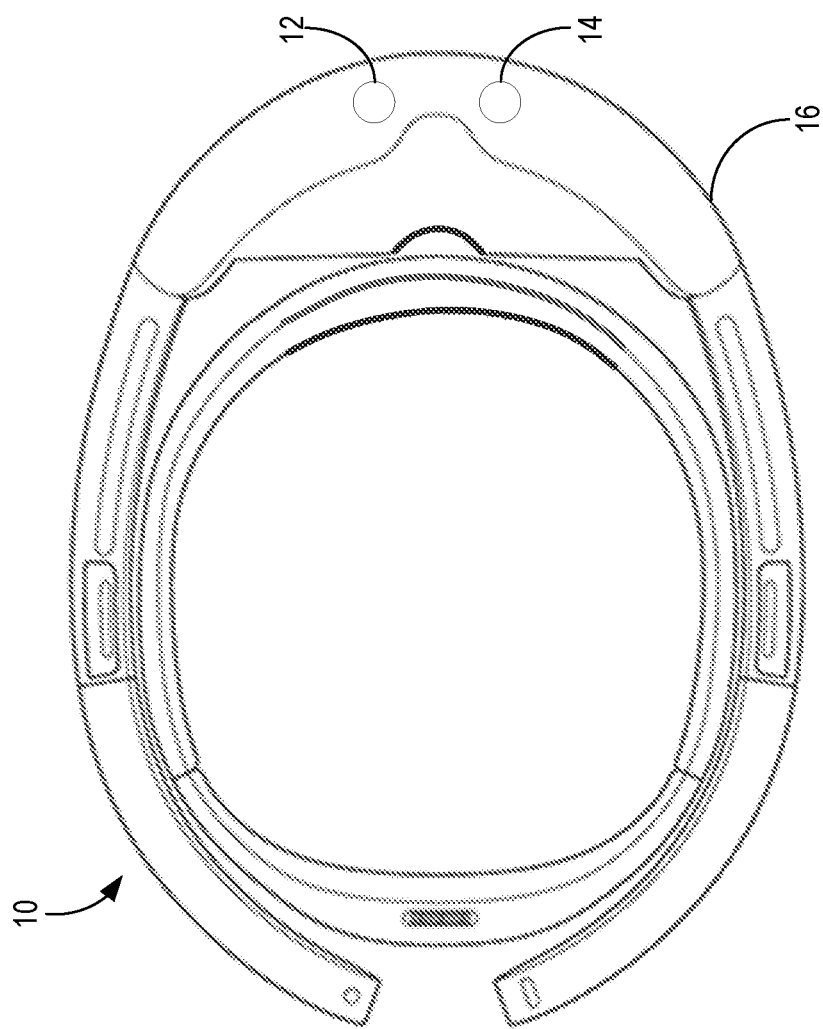

The processor 18 may be configured to execute instructions stored in the storage to receive, from the VL camera 12, a VL image 62 for a frame 68 of a scene 66. The top image of FIG. 2, as discussed above, shows an example VL image 62 for a frame 68 of a scene 66. The processor 18 may be further configured to receive, from the thermal camera 14, a thermal image 64 for the frame 68 of the scene 66. The bottom image of FIG. 2, as discussed above, shows an example thermal image 64 for a frame 68 of a scene 66. FIG. 5 shows an example implementation of the computing system 10 and a schematic of images to be received by the computing system 10. HMD device 16 includes a single VL camera 12 and a thermal camera 14, in this example implementation. The cameras 12, 14 receive light from the scene 66 being viewed by a user of the HMD device 16. For the frame 68 of the scene 66, a VL image 62 and a thermal image 64, each indicated with dashed lines, are generated using the cameras 12, 14 and the computing system 10. The images are shown spatially offset for viewing clarity, though it will be appreciated that they typically are aligned and of the same view of the captured scene.

The processor 18 and associated instructions are configured to detect image discrepancies between the visible light image 62 and the thermal image 64 and, based on the detected image discrepancies, determine a presence of a transparent object 70 in the scene 66. As discussed above with reference to FIG. 2, the VL image 62 depicts some image features, such as background features, that are more clearly discernable than the foreground image features. Likewise, the thermal image 64 depicts some image features, such as foreground features, that are more clearly discernable than the background image features. Furthermore, some reflections in the transparent object 70 (i.e., window) are detected by the thermal camera 14. By combining the VL image 62 and the thermal image 64 as shown visually in the middle image of FIG. 2, a more complete image of the frame 68 becomes apparent. Some of the differences between the images, or the image discrepancies, may be used to identify the presence of the window that is a transparent object 70. The processor 18 may be further configured to, based on the detected discrepancies, output an identification of at least one location 74 (FIG. 6) in the scene that is associated with the transparent object. For example, output may include identification of pixels in the frame 68 that are associated with the transparent object and those that are not. In the middle image of FIG. 2, transparent-object pixels 78 are indicated with a dotted box. Pixels not associated with the transparent object are indicated with a dotted box as object pixels 80.

According to one example implementation, the presence of the transparent object 70 may be identified by configuring the computing system 10 with instructions including a machine learning (ML) algorithm. Specifically, a transparent-object-determining ML algorithm 56 (shown in FIG. 4) may be employed that has been trained using a training data set as a classifier for transparent objects 70. It will be appreciated that the training data set may include a large number of images, both VL and thermal, that include at least one transparent object that is pre-identified and with which the classifier may be trained. Once trained, the transparent-object-determining ML algorithm 56 may be configured to receive the visible light image 62 and the thermal image 64, and determine the presence of the transparent object 70 in the scene 66 by executing the algorithm of the trained classifier on the processor 18. The algorithm may make such determination based on the detected image discrepancies between the visible light image 62 and the thermal image 64. As described above, the processor 18 may also be configured to, based on the detected image discrepancies, output an identification of at least one location 74 in the scene 66 that is associated with the transparent object 70.

Figure 6:
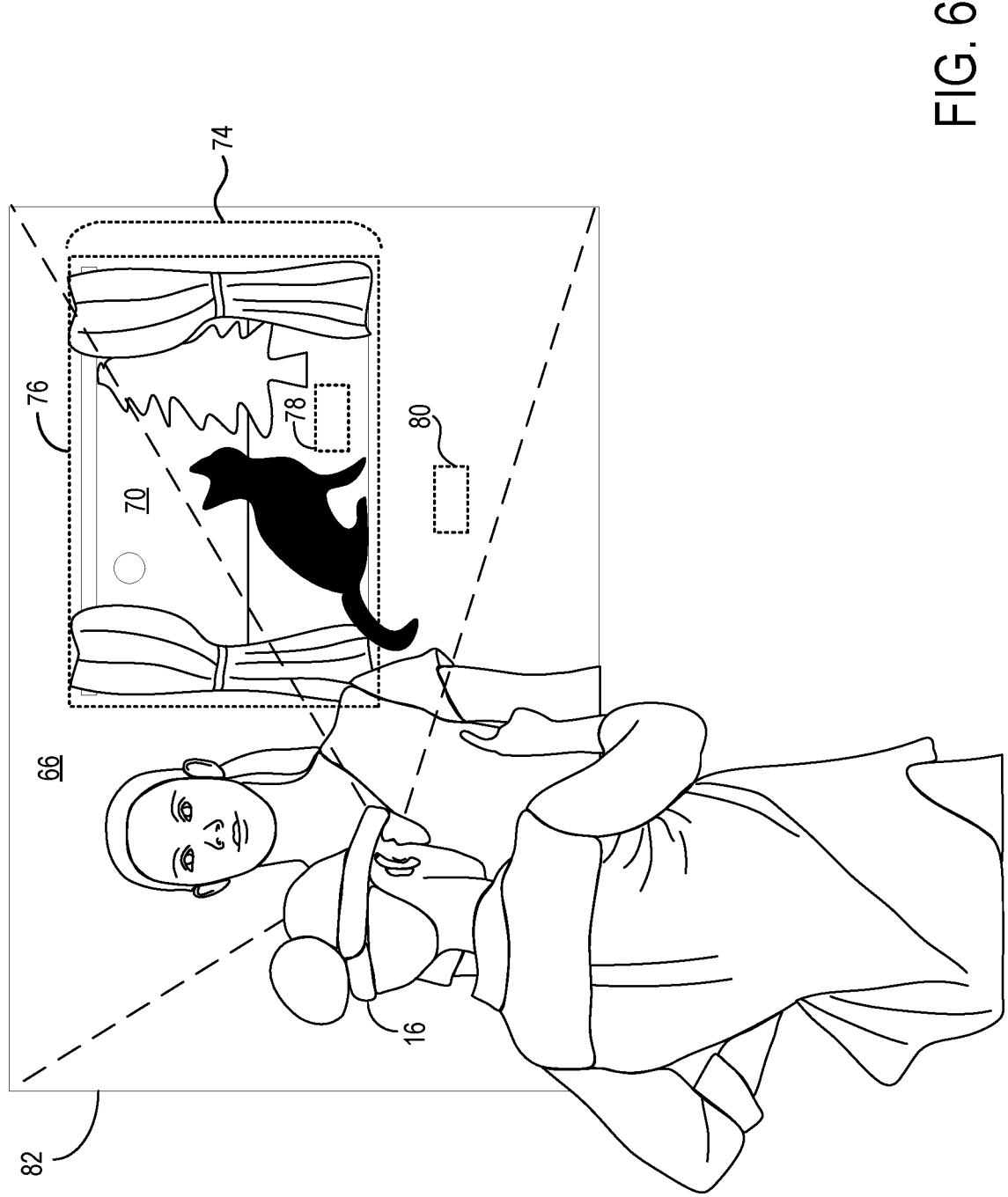
FIG. 6 shows an example of image processing with the computing system of FIG. 1

An example is given in FIG. 6, which is an example of image processing with the described computing system(s). In FIG. 6, a representation 82 of a scene may be displayed on the display 36 of an HMD device 16 (FIG. 3). In this example, a bounding box 76 indicated with a dotted line identifies the location 74 of the transparent object 70, which in this example is a window. However, it will be appreciated that the location 74 of the transparent object 70 may alternatively be indicated with labeled pixels. In either case, transparent-object pixels 78 may be distinguished from object pixels 80 that are not associated with the transparent object. In another example, a binary output may be generated where, for each pixel, "0" indicates no transparent object 70 and "1" indicates a transparent object 70.

According to another example implementation, the computing system 10 may, as described above, include a VL camera 12, a thermal camera 14, a processor 18, and associated storage. The processor 18 may be configured to execute instructions in the storage to receive, from the VL camera 12, a VL image 62 for a frame 68 of a scene 66 and receive, from the thermal camera 14, a thermal image 64 for the frame 68 of the scene 66. The processor 18 may be configured to execute an ML algorithm configured to receive the VL image 62 and the thermal image 64 as input. In this example implementation, the ML algorithm may have been trained using a training data set where the training data set includes a plurality of VL images 62 and a plurality of thermal images 64 that have been segmented to label pixels belonging to transparent objects 70 in the images.

Once trained, the processor 18 may be configured to, with the ML algorithm, process a VL image 62 and a thermal image 64 to determine, based on image discrepancies between the VL image 62 and the thermal image 64, a presence of a transparent object 70 in the scene 66 as described above. The processor 18 may be configured to, with the ML algorithm, identify a plurality of pixels in the frame 68 of the scene 66 that are associated with the transparent object 70 and, for each of the plurality of pixels that are identified as being associated with the transparent object 70, output an indicator that such pixel is associated with the transparent object 70. The indicators for pixels may be segmentation and/or identifiers such as labels and/or bounding boxes 76 as described previously.

The at least one location 74 in the scene 66 may correspond to a plurality of pixels in the frame 68 that are associated with the transparent object 70. The location 74, therefore, may include the transparent-object pixels 78 associated with the transparent object 70, as discussed above with reference to FIG. 2. The processor 18 may be further configured to execute the instructions to determine, for a plurality of pixels in the frame 68 that are not associated with the transparent object 70 (object pixels 80), first depth values corresponding to physical depths of image content not associated with the transparent object 70. With this determination, each of the plurality of pixels in the frame 68 may be assigned a particular depth value. It will be appreciated that some pixels may have both transparent object content and content not associated with the transparent object 70, such as a tree behind a window. In such a case, a single pixel may be assigned a depth value for the tree and a depth value for the window at that pixel. That is, the processor 18 may be further configured to determine, for the plurality of pixels in the frame 68 that are associated with the transparent object 70, second depth values corresponding to physical depths of the transparent object 70. As described above, VL cameras 12, IR cameras, and thermal cameras 14, and known depth detection systems may not, as implemented separately, detect and/or determine depth values for transparent objects 70. Thus, example implementations by which depth values of the transparent object 70 may be determined via the processor 18 are detailed below. It will be appreciated that not every pixel associated with the transparent object 70 or not associated with the transparent object 70 may be assigned a depth value. The first and second depth values may be based on images received from the depth detection system that is described above.

In one example implementation, to determine the first and second depth values, the computing system 10 is configured with instructions including an ML algorithm that is a depth-determining ML algorithm 58 (shown in FIG. 4) that has been trained using a training data set. The training data set for the depth-determining ML algorithm 58 may include VL and thermal images that not only identify a location 74 of a transparent object 70 in the images but also include pre-determined depth values for the pixels in the images, whether for pixels associated with foreground image content, background image content, or the transparent object 70. As discussed above, some image content may be more readily discernable from either the VL image 62 or the thermal image 64: image content visually located behind a transparent object 70 may be background image content only detectable by the VL camera 12. Foreground image content may be visually situated in front of the transparent object 70. Pre-determined depth values of both foreground and background image content may be included in the training data set, as well as pre-determined depth values of the transparent object 70. This information may adequately train the depth-determining ML algorithm 58 to determine depth of general image content in a given image.

Once trained, the depth-determining ML algorithm 58 may be configured to receive the VL image 62, the thermal image 64, and the identification of the at least one location 74 in the scene 66 that is associated with the transparent object 70. The at least one location 74 in the scene 66 may correspond to a plurality of pixels in the frame 68 that are associated with the transparent object 70. The depth-determining ML algorithm 58 may be executable by the processor 18 to, for a plurality of pixels in the frame 68 that are not associated with the transparent object 70, determine first depth values corresponding physical depths of image content not associated with the transparent object 70. For the plurality of pixels in the frame 68 that are associated with the transparent object 70, the depth-determining ML algorithm 58 may be executable to determine second depth values that are transparent object depth values corresponding to physical depths of the transparent object 70. It will be appreciated that as such, if a pixel is designated as associated with the transparent object 70, it may be assigned two depth values: a transparent object depth value and a depth value for background image content appearing to a viewer to be behind the transparent object 70.

Figure 7A:
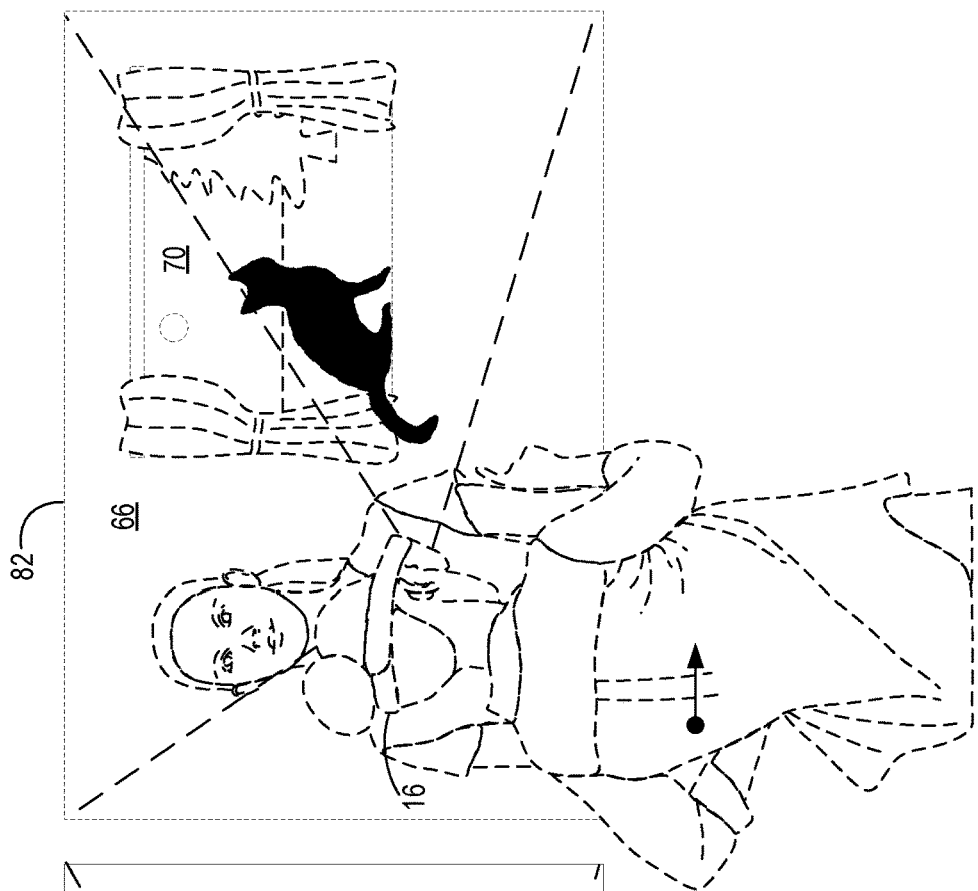
FIGS. 7A and 7B show an example of parallax for depth determination in the computing system of FIG. 1
Figure 7B:
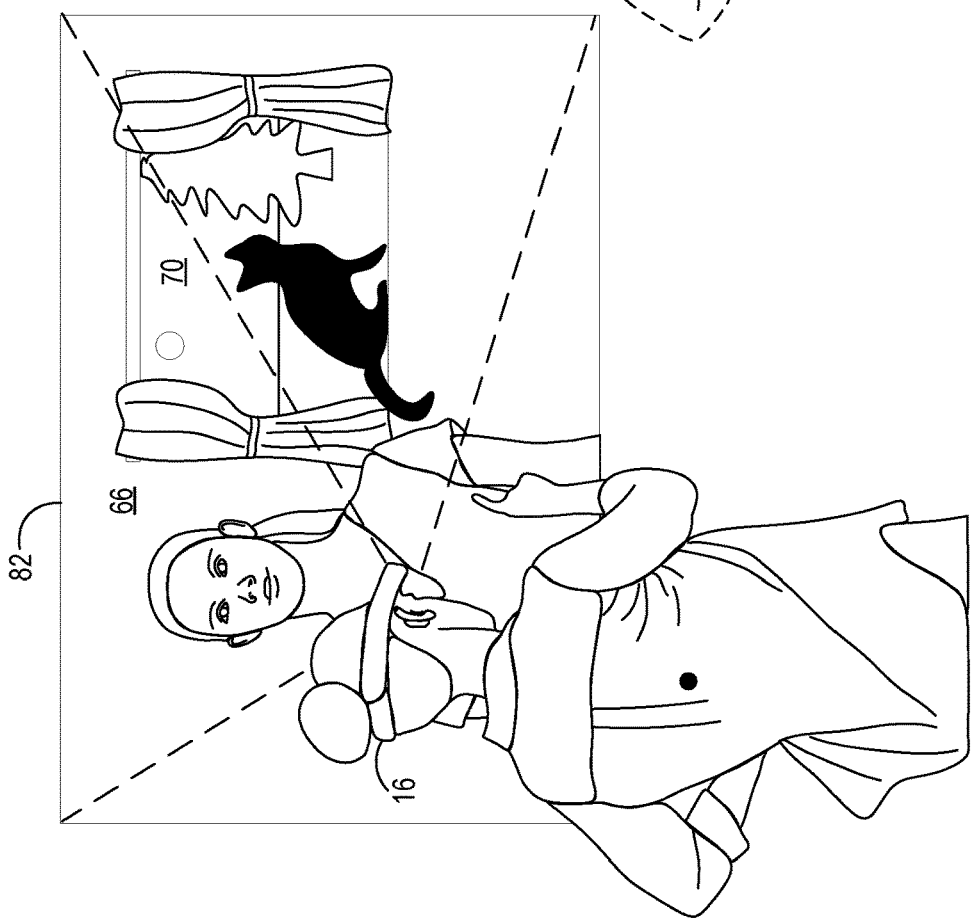

An alternative depth-determining process is described as follows with reference to FIGS. 7A and 7B that show an example of using parallax for depth determination. In this example, the frame 68 may be a first frame 68, the VL image 62 may be a first VL image 62, and the thermal image 64 may be a first thermal image 64. The processor 18 may be configured to execute instructions to receive a second VL image for a second frame 72 of the scene and receive a second thermal image for the second frame 72 of the scene 66. In FIG. 7B, the wearer of the HMD device 16 that views the first frame 68 changes position with respect to the scene 66 before viewing the second frame 72. It will be appreciated that, with respect to the viewer, parallax of foreground image content that includes the figure facing the viewer and (to a lesser extent) the cat behind the figure will be more significant than parallax of the background image content, which here includes the background image content of the moon and the tree. VL and thermal images may be recorded for both the first frame 68 and the second frame 72. The processor 18 may be configured to determine parallax values for image content in the first frame 68 and second frame 72 based on the first and second visible light images and on the first and second thermal images. For at least some pixels in one or both of the first frame 68 and the second frame 72 and based on the determined parallax values, the processor 18 may be configured to determine first depth values corresponding to physical depths of image content not associated with the transparent object 70. The processor 18 may be further configured to, for at least some pixels in one or both of the first frame 68 and the second frame 72 and based on the determined parallax values, determine second depth values corresponding to physical depths of image content associated with the transparent object 70.

In order to actually determine the transparent object depth values, in one example implementation the processor 18 is configured to execute instructions to identify pixels included in image content bordering the transparent object 70 and determine depth values of the image content bordering the transparent object 70 corresponding to physical depths of the image content bordering the transparent object 70. In the example of FIG. 6, pixels belonging to the window frame, curtains, and cat are identified as bordering a transparent object 70. Depth values for these pixels may be found with the depth detecting system and/or the depth-determining ML algorithm described above. The processor 18 may then be configured to infill, for the plurality of pixels in the frame 68 that are associated with the transparent object 70, depth values that are transparent object depth values corresponding to physical depths of the transparent object 70 based on the depth values of the image content bordering the transparent object 70 (e.g., so that the transparent object is assigned depth values close or equal to that of the bordering content). It will be appreciated that the ease of infilling depth values for the transparent object 70 may depend on the flatness of the transparent object 70.

Alternatively, the processor 18 may be configured to execute instructions to identify surface differentiation of the transparent object 70 in the frame 68 and associate one or more pixels with the surface differentiation. Examples may include reflections in the transparent object 70 such as those shown in the bottom image in FIG. 2 or other types of surface differentiation such as flaws, unevenness, markings, and so on that may be present on the transparent object 70. For the one or more pixels associated with the surface differentiation, the processor 18 may be configured to determine depth values corresponding to physical depths of the surface differentiation. For at least some pixels in the frame 68 that are associated with the transparent object 70 and that are not associated with the surface differentiation, the processor 18 may be configured to determine, based on at least one depth value of the surface differentiation of the transparent object 70, depth values that are transparent object depth values corresponding to physical depths of the transparent object 70.

As described above, the computing system 10 may include a display 36 (FIG. 3). Once the first and second depth values are known, the processor 18 may be configured to execute instructions to generate, from the second depth values, a visual representation 82 of the transparent object 70 in the scene 66 and output the visual representation 82 of the transparent object 70 to the display 36. As also described above and detailed in FIG. 3, the VL camera 12 and the thermal camera 14 may be included in the HMD device 16 having the display 36. The processor 18 may be configured to execute instructions to generate, from the first and second depth values, a three-dimensional representation 82 of the scene 66 that is displayed on the display 36 of the HMD device 16, examples of which are shown in FIGS. 6, 7A, and 7B.

Figure 8:
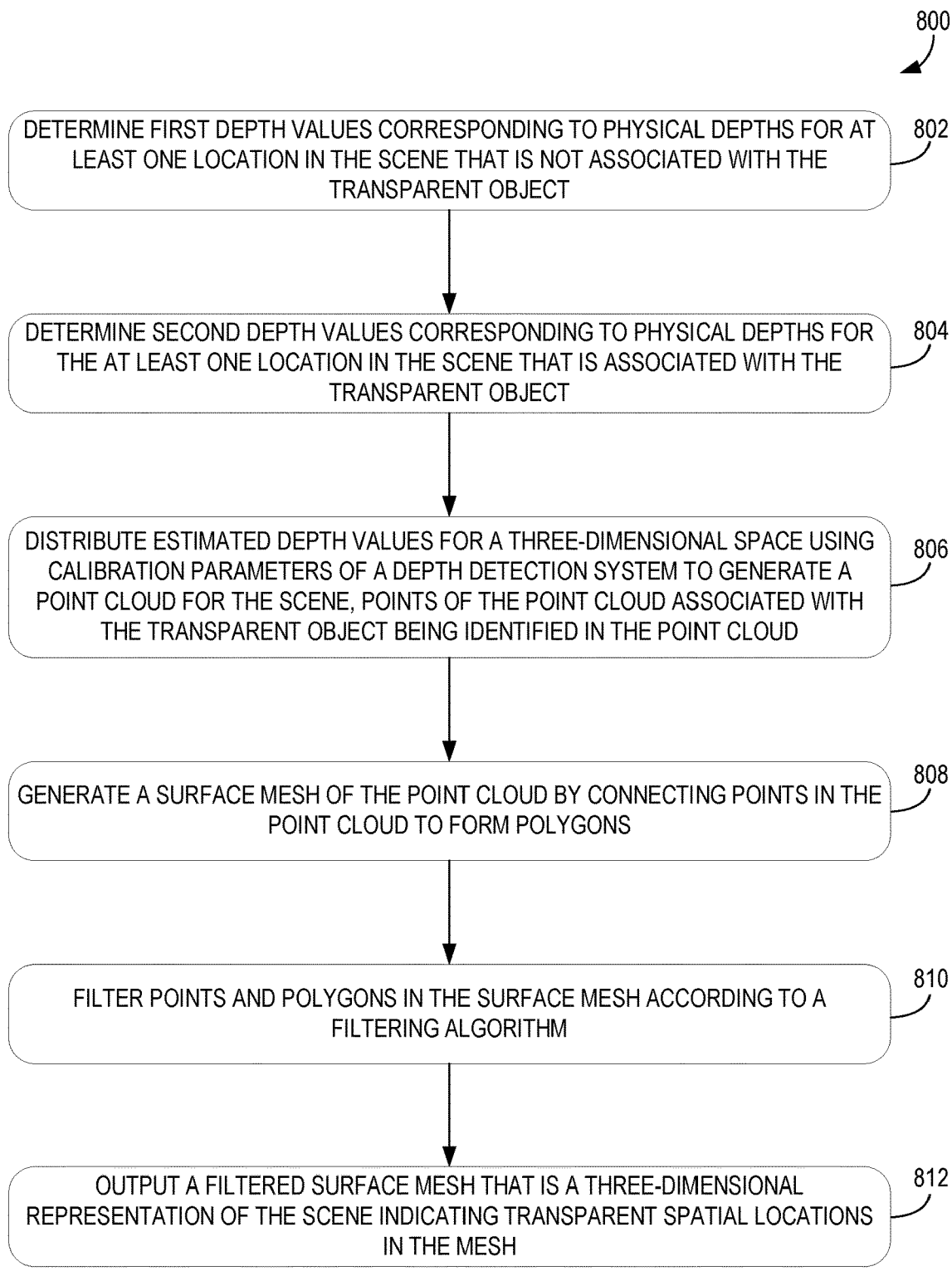
FIG. 8 is a flowchart for steps in generating a point cloud and surface mesh including a transparent object according to one implementation of the present disclosure.

The three-dimensional representation 82 (FIG. 6) of the scene 66 may be generated using a point cloud and three-dimensional mesh. FIG. 8 is a flowchart 800 showing steps for generating a point cloud and three-dimensional surface mesh including a transparent object 70. At 802, the method includes determining first depth values corresponding to physical depths for at least one location in the scene 66 that is not associated with the transparent object. At 804, the method includes determining second depth values corresponding to physical depths for the at least one location in the scene 66 that is associated with the transparent object.

Figure 9C:
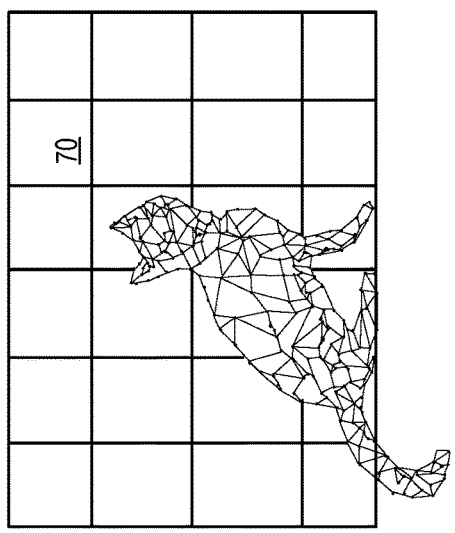
FIGS. 9A-9C show an example for generating a point cloud and surface mesh according to one implementation of the present disclosure.
Figure 9B:
Figure 9A:
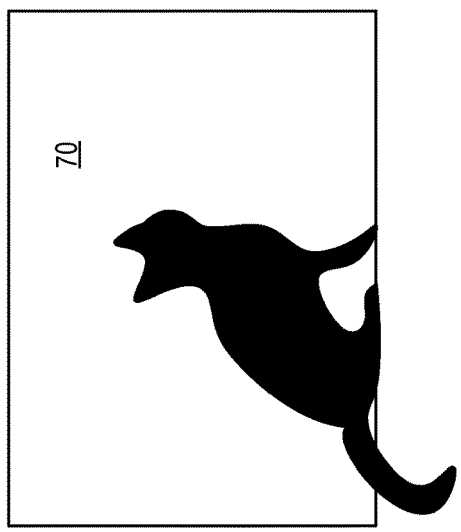

FIG. 9A shows a section of a scene 66 including a cat and a transparent object 70 (window). First depth values may be determined for the cat while second depth values may be determined for the window. At 806, the method further includes distributing estimated depth values for a three-dimensional space using calibration parameters of a depth detection system to generate a point cloud for the scene 66, points of the point cloud associated with the transparent object being identified in the point cloud. FIG. 9B depicts a point cloud representation of the cat and the window 70 of FIG. 9A. One potential advantage of this configuration is that points in the point cloud may be assigned to the transparent object 70, where otherwise a void, null, or blank area may appear. Following this step, at 808 the method includes generating a surface mesh of the point cloud by connecting points in the point cloud to form polygons. At 810, the method includes filtering points and polygons in the surface mesh according to a filtering algorithm. FIG. 9C shows a surface mesh of the cat and window of FIG. 9A according to one example implementation. As shown, the transparent object 70 may be represented in the surface mesh, and as such, may be rendered in a three-dimensional representation 82 (FIG. 6) of the scene 66 in a subsequent step. In FIG. 8, at 812 the method further includes outputting a filtered surface mesh that is a three-dimensional representation 82 (FIG. 6) of the scene 66 indicating transparent spatial locations in the three-dimensional mesh.

From the foregoing description, it will be appreciated that the transparent-object-determining ML algorithm 56 and the depth-determining ML algorithm 58 may be directly and explicitly linked to detecting and determining the depth of transparent object 70 via the computing system 10. A potential advantage of this configuration is improved and accurate determination by the sensors 30 of the presence of and depths of transparent objects 70. Consequently, there may be fewer repeated attempts by the sensors to re-analyze transparent objects 70 that may otherwise result in void regions, potentially increasing processing efficiency. Thus, processing and rendering of three-dimensional surface meshes for physical environments and objects therein that are detected by the sensors may be improved. Furthermore, the potential technical advantages may be passed to holograms that may be generated from the surface meshes. The potential technical advantages of the computing system 10 may thus extend from sensing and detection to rendering and output to be displayed by a viewer.

Figure 10:
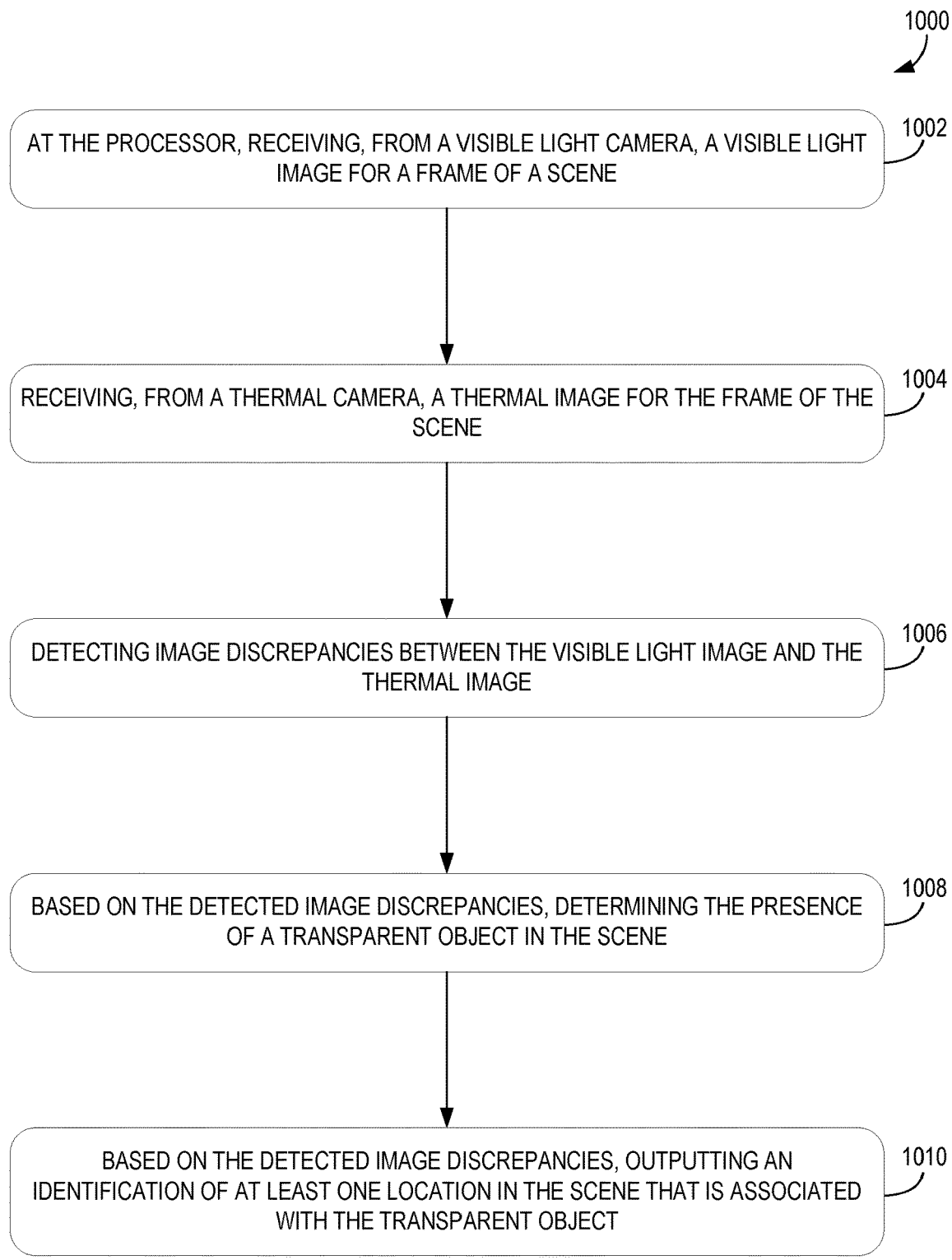
FIG. 10 is a flowchart of a method according to one implementation of the present disclosure.

FIG. 10 shows a flowchart of a method 1000 for detecting and identifying transparent objects 70 using visible light and thermal images. The method 1000 may be employed in connection with the systems shown in FIGS. 3 and 4, or on other suitable systems/hardware. At 1002, the method includes receiving, from a VL camera 12, a VL image 62 for a frame of a scene (e.g., frame 68 of scene 66 in FIGS. 1 and 2)). As previously discussed, the frame 68 may include collected information associated with the scene 66, where VL, thermal, depth, and/or other information may be combined within the frame. At 1004, the method 1000 includes receiving, from a thermal camera 14, a thermal image 64 for the frame 68 of the scene 66. At 1006, the method 1000 includes detecting image discrepancies between the VL image 62 and the thermal image 64. Differences between the VL image 62 and thermal image 64, such as foreground and background image content that is not duplicated in each image, may be utilized as image discrepancies. At 1008, the method 1000 includes, based on the detected image discrepancies, determining the presence of a transparent object 70 in the scene 66. At 1010, the method 1000 includes, based on the detected image discrepancies, outputting an identification of at least one location in the scene 66 that is associated with the transparent object 70. The location may be indicated with a bounding box, segmentation, and/or other type of identification.

As described above, the method 1000 may employ an ML algorithm that is a transparent-object determining ML algorithm 56 that has been trained using a training data set as a classifier for transparent objects 70. The ML algorithm may be configured to receive the VL image 62 and the thermal image 64. Determining the presence of the transparent object 70 in the scene 66 may include executing the ML algorithm to determine, based on the detected image discrepancies between the VL image 62 and the thermal image 64, the presence of the transparent object 70 in the scene 66. A potential advantage of this configuration is that a transparent object 70, while not discernable in a single image, may be inferred from data in a frame 68 including image data from both a VL camera 12 and a thermal camera 14.

As described above, the location in the scene 66 associated with the transparent object 70 may correspond to a plurality of pixels in the frame that are associated with the transparent object 70. Then, the method 1000 may further include determining, for pixels in the frame that are not associated with the transparent object, first depth values corresponding to physical depths of image content not associated with the transparent object 70. The method 1000 may include determining, for pixels in the frame 68 that are associated with the transparent object 70, second depth values corresponding to physical depths of the transparent object 70. It will be appreciated that physical depth values may be determined for a sampling of pixels either associated or not associated with the transparent object, and not determined for every pixel in the frame 68.

Method 1000 may employ a depth-determining ML algorithm 58. As described above, such algorithm may determine (1) first depth values corresponding to physical depths of image content not associated with the transparent object 70, and (2) second depth values corresponding to physical depths of the transparent object 70. Alternatively, the method 1000 may employ the above-described parallax technique to determine depth values for transparent objects 70 and other content. Still further, the above infilling technique may be used to derive transparent object depth based on content/structure bordering the transparent object 70. Still further, the above-described surface differentiation technique may be used in connection with method 1000 to determine transparent object depth.

In some embodiments, the methods and processes described herein may be tied to a computing system of one or more computing devices. In particular, such methods and processes may be implemented as an executable computer-application program, a network-accessible computing service, an application-programming interface (API), a library, or a combination of the above and/or other computer resources.

FIG. 11 schematically shows a simplified representation of a computing system 1100 configured to provide any to all of the compute functionality described herein. Computing system 1100 may take the form of one or more virtual/augmented/mixed reality computing devices, personal computers, network-accessible server computers, tablet computers, home-entertainment computers, gaming devices, mobile computing devices, mobile communication devices (e.g., smart phone), wearable computing devices, Internet of Things (IoT) devices, embedded computing devices, and/or other computing devices.

Computing system 1100 includes a logic subsystem 1102 and a storage subsystem 1104. Computing system 1100 may optionally include a display subsystem 1106, input subsystem 1108, communication subsystem 1110, and/or other subsystems not shown in FIG. 11.

Logic subsystem 1102 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1104 includes one or more physical devices configured to temporarily and/or permanently hold computer information such as data and instructions executable by the logic subsystem. When the storage subsystem includes two or more devices, the devices may be collocated and/or remotely located. Storage subsystem 1104 may include volatile, nonvolatile, dynamic, static, read/write, read-only, random-access, sequential-access, location-addressable, file-addressable, and/or content-addressable devices. Storage subsystem 1104 may include removable and/or built-in devices. When the logic subsystem executes instructions, the state of storage subsystem 1104 may be transformed—e.g., to hold different data.

Aspects of logic subsystem 1102 and storage subsystem 1104 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1106 may be used to present a visual representation of data held by storage subsystem 1104. This visual representation may take the form of a graphical user interface (GUI) including holographic virtual objects. Display subsystem 1106 may include one or more display devices utilizing virtually any type of technology. In some implementations, display subsystem 1106 may include one or more virtual-, augmented-, or mixed reality displays.

When included, input subsystem 1108 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1110 may be configured to communicatively couple computing system 1100 with one or more other computing devices. Communication subsystem 1110 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data should only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AT components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

The following paragraphs provide additional support for the claims of the subject application. One aspect provides a computing system comprising a visible light camera, a thermal light camera, and a processor and associated storage. The processor is configured to execute instructions stored in the storage to receive, from the visible light camera, a visible light image for a frame of a scene and to receive, from the thermal camera, a thermal image for the frame of the scene. The processor is configured to detect image discrepancies between the visible light image and the thermal image and, based on the detected image discrepancies, determine a presence of a transparent object in the scene. The processor is configured to, based on the detected image discrepancies, output an identification of at least one location in the scene that is associated with the transparent object.

In this aspect, additionally or alternatively, the at least one location in the scene may correspond to a plurality of pixels in the frame that are associated with the transparent object. The processor may be configured to execute the instructions to determine, for a plurality of pixels in the frame that are not associated with the transparent object, first depth values corresponding to physical depths of image content not associated with the transparent object. The processor may be further configured to execute the instructions to determine, for the plurality of pixels in the frame that are associated with the transparent object, second depth values corresponding to physical depths of the transparent object.

In this aspect, additionally or alternatively, the processor may be configured to execute the instructions to identify pixels included in image content bordering the transparent object and determine depth values of the image content bordering the transparent object corresponding to physical depths of the image content bordering the transparent object. The processor may be further configured to execute the instructions to infill, for the plurality of pixels in the frame that are associated with the transparent object, depth values that are transparent object depth values corresponding to physical depths of the transparent object based on the depth values of the image content bordering the transparent object.

In this aspect, additionally or alternatively, the processor may be configured to execute the instructions to identify surface differentiation of the transparent object in the frame and associate one or more pixels with the surface differentiation, and for one or more pixels associated with the surface differentiation, determine depth values corresponding to physical depths of the surface differentiation. The processor may be further configured to execute the instructions to, for at least some pixels in the frame that are associated with the transparent object and that are not associated with the surface differentiation, determine, based on at least one depth value of the surface differentiation of the transparent object, depth values that are transparent object depth values corresponding to physical depths of the transparent object.

In this aspect, additionally or alternatively, the computing system may further comprise a depth detection system including components selected from the group consisting of a pair of stereo cameras, a pair of stereo low-level light cameras, a single camera and an inertial measurement unit (IMU), the single camera and a light projector, a pair of cameras and the light projector, and a laser light source and a camera. Determining the first and second depth values may be based on images received from the depth detection system.

In this aspect, additionally or alternatively, the computing system may further comprise a display, and the processor may be further configured to execute the instructions to generate, from the second depth values, a visual representation of the transparent object in the scene and output the visual representation of the transparent object to the display. In this aspect, additionally or alternatively, the visible light camera and the thermal camera may be included in a head-mounted display (HMD) device having a display. The processor may be further configured to execute the instructions to generate, from the first and second depth values, a three-dimensional representation of the scene that is displayed on the display of the HMD device.

In this aspect, additionally or alternatively, the at least one location in the scene may correspond to a plurality of pixels in the frame that are associated with the transparent object. The instructions may further comprise a machine learning (ML) algorithm that has been trained using a training data set and is configured to receive the visible light image and the thermal image. The ML algorithm may be executable by the processor to, for a plurality of pixels in the frame that are not associated with the transparent object, determine first depth values corresponding physical depths of image content not associated with the transparent object. The ML algorithm may be further executable by the processor to, for the plurality of pixels in the frame that are associated with the transparent object, determine second depth values that are transparent object depth values corresponding to physical depths of the transparent object.

In this aspect, additionally or alternatively, the frame may be a first frame, the visible light image may be a first visible light image, and the thermal image may be a first thermal image. The processor may be further configured to execute the instructions to receive a second visible light image for a second frame of the scene and receive a second thermal image for the second frame of the scene. The processor may be further configured to execute the instructions to determine parallax values for image content in the first and second frames based on the first and second visible light images and on the first and second thermal images, and for at least some pixels in one or both of the first frame and the second frame, and based on the determined parallax values, determine first depth values corresponding to physical depths of image content not associated with the transparent object. The processor may be further configured to execute the instructions to, for at least some pixels in one or both of the first frame and the second frame, and based on the determined parallax values, determine second depth values corresponding to physical depths of image content associated with the transparent object.

In this aspect, additionally or alternatively, the instructions may further comprise a machine learning (ML) algorithm that has been trained using a training data set as a classifier for transparent objects and is configured to receive the visible light image and the thermal image. Determining the presence of the transparent object in the scene may include executing the ML algorithm on the processor to determine, based on the detected image discrepancies between the visible light image and the thermal image, the presence of the transparent object in the scene.

In this aspect, additionally or alternatively, the processor may be further configured to execute the instructions to determine first depth values corresponding to physical depths for at least one location in the scene that is not associated with the transparent object, and determine second depth values corresponding to physical depths for the at least one location in the scene that is associated with the transparent object. The processor may be further configured to execute the instructions to distribute estimated depth values for a three-dimensional space using calibration parameters of a depth detection system to generate a point cloud for the scene, points of the point cloud associated with the transparent object being identified in the point cloud. The processor may be further configured to generate a surface mesh of the point cloud by connecting points in the point cloud to form polygons, filter points and polygons in the surface mesh according to a filtering algorithm, and output a filtered surface mesh that is a three-dimensional representation of the scene indicating transparent spatial locations in the mesh.

In this aspect, additionally or alternatively, the visible light camera may be configured to receive and detect light in a range of 350 nm to 1200 nm and/or 1000 nm to 1600 nm, and the thermal camera may be configured to receive and detect light in a range of 5,000 nm to 15,000 nm.

Another aspect provides a method for use with a computing device including a processor and associated storage. The processor may be configured to execute instructions stored in the storage. The method may comprise receiving, at the processor, from a visible light camera, a visible light image for a frame of a scene and, from a thermal camera, a thermal image for the frame of the scene. The method may further comprise, at the processor, detecting image discrepancies between the visible light image and the thermal image. The method may further comprise, at the processor, based on the detected image discrepancies, determining the presence of a transparent object in the scene and outputting an identification of at least one location in the scene that is associated with the transparent object.

In this aspect, additionally or alternatively, the at least one location in the scene may correspond to a plurality of pixels in the frame that are associated with the transparent object. The method may further comprise, at the processor, determining, for a plurality of pixels in the frame that are not associated with the transparent object, first depth values corresponding to physical depths of image content not associated with the transparent object and determining, for the plurality of pixels in the frame that are associated with the transparent object, second depth values corresponding to physical depths of the transparent object.

In this aspect, additionally or alternatively, the method may comprise, at the processor, identifying pixels included in image content bordering the transparent object and determining depth values of the image content bordering the transparent object corresponding to physical depths of the image content bordering the transparent object. The method may further comprise, at the processor, infilling, for the plurality of pixels in the frame of the scene that are associated with the transparent object, depth values that are transparent object depth values corresponding to physical depths of the transparent object based on the depth values of the image content bordering the transparent object.

In this aspect, additionally or alternatively, the method may comprise, at the processor, identifying surface differentiation of the transparent object in the frame and associating one or more pixels with the surface differentiation, and for the one or more pixels associated with the surface differentiation, determining depth values corresponding to physical depths of the surface differentiation. The method may further comprise, at the processor, for at least some pixels in the frame that are associated with the transparent object and that are not associated with the surface differentiation, determining, based on at least one depth value of the surface differentiation of the transparent object, depth values that are transparent object depth values corresponding to physical depths of the transparent object.

In this aspect, additionally or alternatively, the method may comprise, at the processor, generating, from the second depth values, a visual representation of the transparent object in the scene and outputting the visual representation of the transparent object to a display.

In this aspect, additionally or alternatively, the at least one location in the scene may correspond to a plurality of pixels in the frame that are associated with the transparent object. The instructions may further comprise a machine learning (ML) algorithm that has been trained using a training data set and is configured to receive the visible light image, the thermal image, and the identification of the at least one location in the scene that is associated with the transparent object. The method may further comprise, at the processor, for a plurality of pixels in the frame that are not associated with the transparent object, executing the ML algorithm to determine first depth values corresponding physical depths of image content not associated with the transparent object. The method may further comprise, at the processor, for the plurality of pixels in the frame that are associated with the transparent object, executing the ML algorithm to determine second depth values that are transparent object depth values corresponding to physical depths of the transparent object.

In this aspect, additionally or alternatively, the frame may be a first frame, the visible light image may be a first visible light image, and the thermal image may be a first thermal image. The method may further comprise, at the processor, receiving a second visible light image for a second frame of the scene, receiving a second thermal image for the second frame of the scene, and determining parallax values for image content in the first and second frames based on the first and second visible light images and on the first and second thermal images. The method may further comprise, at the processor, for at least some pixels in one or both of the first frame and the second frame, and based on the determined parallax values, determining first depth values corresponding to physical depths of image content not associated with the transparent object. The method may further comprise, at the processor, for at least some pixels in one or both of the first frame and the second frame, and based on the at least one location in the scene and the determined parallax values, determining second depth values corresponding to physical depths of image content associated with the transparent object.

Another aspect provides a computing system comprising a visible light camera, a thermal camera, and a processor and associated storage, the processor being configured to execute instructions stored in the storage to receive, from the visible light camera, a visible light image for a frame of a scene and receive, from the thermal camera, a thermal image for the frame of the scene. The processor is further configured to execute the instructions to execute a machine learning (ML) algorithm configured to receive the visible light image and the thermal image as input, the ML algorithm having been trained using a training data set. The training data set includes a plurality of visible light images and a plurality of thermal images having been segmented to label pixels belonging to transparent objects present in the plurality of visible light images and thermal images. The processor is further configured to execute the instructions to, with the ML algorithm, process the visible light image and the thermal image to determine, based on image discrepancies between the visible light image and the thermal image, a presence of a transparent object in the scene, and with the ML algorithm, identify a plurality of pixels in the frame of the scene that are associated with the transparent object. The processor is further configured to execute the instructions to, for each of the plurality of pixels that are identified as being associated with the transparent object, output an indicator that such pixel is associated with the transparent object.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. If used herein, a phrase of the form "at least one of A and B" means at least one A or at least one B, without being mutually exclusive of each other, and does not require at least one A and at least one B. If used herein, the phrase "and/or" means any or all of multiple stated possibilities.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
   a visible light camera;
   a thermal camera; and
   a processor and associated storage, the processor being configured to execute instructions stored in the storage to:
   receive, from the visible light camera, a visible light image for a frame of a scene;
   receive, from the thermal camera, a thermal image for the frame of the scene;
   detect image discrepancies between the visible light image and the thermal image, said image discrepancies including image features more discernable in the thermal image and less discernable in the visible light image;
   based on the detected image discrepancies, determine a presence of a transparent object in the scene;
   based on the detected image discrepancies, identify a plurality of pixels in the frame that are associated with the transparent object and a plurality of pixels in the frame that are associated with image content bordering the transparent object;
   determine depth values for the plurality of pixels associated with the image content bordering the transparent object; and
   infill, for each of the plurality of pixels in the frame that are associated with the transparent object, depth values corresponding to physical depths of the transparent object in the scene based on the depth values of the plurality of pixels associated with the image content bordering the transparent object.

2. The computing system of claim 1, the processor further configured to execute the instructions to:
   identify surface differentiation of the transparent object in the frame and associate one or more pixels with the surface differentiation;
   for the one or more pixels associated with the surface differentiation, determine depth values corresponding to physical depths of the surface differentiation; and
   for at least some pixels in the frame that are associated with the transparent object and that are not associated with the surface differentiation, determine, based on at least one depth value of the surface differentiation of the transparent object and the depth values for the plurality of pixels associated with the image content bordering the transparent object, depth values that are transparent object depth values corresponding to physical depths of the transparent object.

3. The computing system of claim 1, further comprising a depth detection system including components selected from the group consisting of a pair of stereo cameras, a pair of stereo low-level light cameras, a single camera and an inertial measurement unit (IMU), the single camera and a light projector, a pair of cameras and the light projector, and a laser light source and a camera, wherein determining the first and second depth values is based on images received from the depth detection system.

4. The computing system of claim 1, further comprising a display, the processor further configured to execute the instructions to:
   generate, from the depth values for the plurality of pixels associated with the transparent object, a visual representation of the transparent object in the scene; and
   output the visual representation of the transparent object to the display.

5. The computing system of claim 1, wherein the visible light camera and the thermal camera are included in a head-mounted display (HMD) device having a display, the processor further configured to execute the instructions to generate, from the first and second depth values, a three-dimensional representation of the scene that is displayed on the display of the HMD device.

6. The computing system of claim 1, the instructions further comprising a machine learning (ML) algorithm that has been trained using a training data set and is configured to receive the visible light image and the thermal image, and wherein the ML algorithm is executable by the processor to:

determine the depth values for the plurality of pixels associated with the image content bordering the transparent object; and infill, for each of the plurality of pixels in the frame that are associated with the transparent object, the depth values corresponding to physical depths of the transparent object in the scene.

7. The computing system of claim 1, wherein the frame is a first frame, the visible light image is a first visible light image, and the thermal image is a first thermal image, the processor further configured to execute the instructions to:

receive a second visible light image for a second frame of the scene;

receive a second thermal image for the second frame of the scene;

determine parallax values for image content in the first and second frames based on the first and second visible light images and on the first and second thermal images;

for at least some pixels in one or both of the first frame and the second frame, and based on the determined parallax values, determine first depth values corresponding to physical depths of image content not associated with the transparent object; and for at least some pixels in one or both of the first frame and the second frame, and based on the determined parallax values, determine second depth values corresponding to physical depths of image content associated with the transparent object.

8. The computing system of claim 1, the instructions further comprising a machine learning (ML) algorithm that has been trained using a training data set as a classifier for transparent objects and is configured to receive the visible light image and the thermal image, wherein determining the presence of the transparent object in the scene includes executing the ML algorithm on the processor to determine, based on the detected image discrepancies between the visible light image and the thermal image, the presence of the transparent object in the scene.

9. The computing system of claim 1, the processor further configured to execute the instructions to:

determine first depth values corresponding to physical depths for at least one location in the scene that is not associated with the transparent object;

determine second depth values corresponding to physical depths for the at least one location in the scene that is associated with the transparent object;

distribute estimated depth values for a three-dimensional space using calibration parameters of a depth detection system to generate a point cloud for the scene, points of the point cloud associated with the transparent object being identified in the point cloud;

generate a surface mesh of the point cloud by connecting points in the point cloud to form polygons;

filter points and polygons in the surface mesh according to a filtering algorithm; and output a filtered surface mesh that is a three-dimensional representation of the scene indicating transparent spatial locations in the mesh.

10. The computing system of claim 1, wherein the visible light camera is configured to receive and detect light in a range of 350 nm to 1200 nm and/or 1000 nm to 1600 nm, and the thermal camera is configured to receive and detect light in a range of 5,000 nm to 15,000 nm.

11. A method for use with a computing device including a processor and associated storage, the processor being configured to execute instructions stored in the storage, the method comprising:

at the processor:

receiving, from a visible light camera, a visible light image for a frame of a scene;

receiving, from a thermal camera, a thermal image for the frame of the scene;

detecting image discrepancies between the visible light image and the thermal image, said image discrepancies including image features more discernable in the thermal image and less discernable in the visible light image;

based on the detected image discrepancies, determine a presence of a transparent object in the scene; and based on the detected image discrepancies, identifying a plurality of pixels in the frame that are associated with the transparent object and a plurality of pixels in the frame that are associated with image content bordering the transparent object;

determining depth values for the plurality of pixels associated with the image content bordering the transparent object; and infilling for each of the plurality of pixels in the frame that are associated with the transparent object, depth values corresponding to physical depths of the transparent object in the scene based on the depth values of the plurality of pixels associated with the image content bordering the transparent object.

12. The method of claim 11, the method further comprising, at the processor:

identifying surface differentiation of the transparent object in the frame and associating one or more pixels with the surface differentiation;

for the one or more pixels associated with the surface differentiation, determining depth values corresponding to physical depths of the surface differentiation; and for at least some pixels in the frame that are associated with the transparent object and that are not associated with the surface differentiation, determining, based on at least one depth value of the surface differentiation of the transparent object and the depth values for the plurality of pixels associated with the image content bordering the transparent object, depth values that are transparent object depth values corresponding to physical depths of the transparent object.

13. The method of claim 11, the method further comprising, at the processor:

generating, from the second depth values, a visual representation of the transparent object in the scene; and outputting the visual representation of the transparent object to a display.

14. The method of claim 11, wherein the instructions further comprise a machine learning (ML) algorithm that has been trained using a training data set and is configured to receive the visible light image, the thermal image, and the method further comprising, at the processor:

executing the ML algorithm to determine the depth values for the plurality of pixels associated with the image content; and executing the ML algorithm to infill the depth values for the plurality of pixels in the frame that are associated with the transparent object and correspond to physical depths of the transparent object in the scene.

15. The method of claim 11, wherein the frame is a first frame, the visible light image is a first visible light image, and the thermal image is a first thermal image, the method further comprising, at the processor:
- receiving a second visible light image for a second frame of the scene;
- receiving a second thermal image for the second frame of the scene;
- determining parallax values for image content in the first and second frames based on the first and second visible light images and on the first and second thermal images;
- for at least some pixels in one or both of the first frame and the second frame, and based on the determined parallax values, determining first depth values corresponding to physical depths of image content not associated with the transparent object; and
- for at least some pixels in one or both of the first frame and the second frame, and based on the at least one location in the scene and the determined parallax values, determining second depth values corresponding to physical depths of image content associated with the transparent object.

16. A computing system, comprising:
a visible light camera;
a thermal camera; and
a processor and associated storage, the processor being configured to execute instructions stored in the storage to:
- receive, from the visible light camera, a visible light image for a frame of a scene;
- receive, from the thermal camera, a thermal image for the frame of the scene;
- execute a machine learning (ML) algorithm configured to receive the visible light image and the thermal image as input, the ML algorithm having been trained using a training data set, wherein the training data set includes a plurality of visible light images and a plurality of thermal images having been segmented to label pixels belonging to transparent objects present in the plurality of visible light images and thermal images;
- with the ML algorithm, process the visible light image and the thermal image to determine, based on image discrepancies between the visible light image and the thermal image, a presence of a transparent object in the scene;
- with the ML algorithm, identify a plurality of pixels in the frame of the scene that are associated with the transparent object;
- identify a plurality of pixels in the frame that are associated with image content bordering the transparent object;
- determine depth values for the plurality of pixels associated with the image content bordering the transparent object; and
- infill, for each of the plurality of pixels in the frame that are associated with the transparent object, depth values corresponding to physical depths of the transparent object in the scene based on the depth values of the plurality of pixels associated with the image content bordering the transparent object.

* * * * *